(12) United States Patent
Millar et al.

(10) Patent No.: US 8,768,528 B2
(45) Date of Patent: Jul. 1, 2014

(54) ELECTRICAL THERMAL STORAGE WITH EDGE-OF-NETWORK TAILORED ENERGY DELIVERY SYSTEMS AND METHODS

(75) Inventors: Jessica Millar, Barrington, RI (US); David A. Durfee, North Scituate, RI (US)

(73) Assignee: VCharge, Inc., Providence, RI (US)

( * ) Notice: Subject to any disclaimer, the term of this patent is extended or adjusted under 35 U.S.C. 154(b) by 403 days.

(21) Appl. No.: 13/108,500

(22) Filed: May 16, 2011

(65) Prior Publication Data

US 2012/0296479 A1    Nov. 22, 2012

(51) Int. Cl.
- G05D 17/00 (2006.01)
- G05D 23/00 (2006.01)
- G01R 15/00 (2006.01)
- G01R 13/00 (2006.01)

(52) U.S. Cl.
USPC ........... 700/295; 700/275; 700/276; 700/277; 700/278; 702/57; 702/58; 702/59

(58) Field of Classification Search
None
See application file for complete search history.

(56) References Cited

U.S. PATENT DOCUMENTS

| | | | |
|---|---|---|---|
| 4,345,162 A * | 8/1982 | Hammer et al. | 307/39 |
| 4,570,052 A * | 2/1986 | Smith | 392/340 |
| 4,868,412 A | 9/1989 | Owens | |
| 5,042,081 A | 8/1991 | Steffes et al. | |
| 5,081,591 A * | 1/1992 | Hanway et al. | 323/205 |
| 5,086,493 A | 2/1992 | Steffes | |
| 5,201,024 A | 4/1993 | Steffes | |
| 5,534,734 A * | 7/1996 | Pugh et al. | 307/38 |
| 5,927,598 A | 7/1999 | Broe | |
| 6,510,369 B1 * | 1/2003 | Lacy | 700/295 |
| 6,553,413 B1 | 4/2003 | Leighton et al. | |
| 6,813,897 B1 * | 11/2004 | Bash et al. | 62/175 |
| 7,142,949 B2 | 11/2006 | Brewster et al. | |
| 7,333,880 B2 | 2/2008 | Brewster et al. | |
| 8,019,697 B2 * | 9/2011 | Ozog | 705/412 |
| 8,335,596 B2 * | 12/2012 | Raman et al. | 700/295 |
| 2002/0038279 A1 | 3/2002 | Samuelson et al. | |
| 2002/0116139 A1 * | 8/2002 | Przydatek et al. | 702/62 |
| 2004/0024494 A1 * | 2/2004 | Bayoumi et al. | 700/286 |
| 2005/0165511 A1 * | 7/2005 | Fairlie | 700/286 |
| 2005/0279292 A1 * | 12/2005 | Hudson et al. | 122/32 |
| 2006/0155555 A1 * | 7/2006 | Barsness et al. | 705/1 |
| 2006/0279088 A1 * | 12/2006 | Miller et al. | 290/44 |

(Continued)

OTHER PUBLICATIONS

Millar et al., "Baby Smart Grid; Concord Light", 2009, 7 pages.*

(Continued)

*Primary Examiner* — Kavita Padmanabhan
*Assistant Examiner* — Thomas Stevens
(74) *Attorney, Agent, or Firm* — Kuta IP Law, LLC; Christine M. Kuta (57) ABSTRACT

A method and apparatus of controlling the electric power usage of electric thermal storage heaters and systems are based on: 1) current and recorded measurements local to the heater and building; 2) current measurements external to the heater and building; 3) forecasts communicated to the apparatus. The method also includes sending out communications about power use as well as various other local measurements. The apparatus has local controls on the electric thermal storage, including but not limited to the relays that control flow of power into the heating elements, a logic module that integrates the local controls, as well as communication channels that extend outside the building to entities capable of providing automatic forecasts and potentially other types of information not available locally.

10 Claims, 6 Drawing Sheets

(56) References Cited

U.S. PATENT DOCUMENTS

| | | |
|---|---|---|
| 2007/0112694 A1 | 5/2007 | Metcalfe |
| 2007/0177319 A1* | 8/2007 | Hirst .............................. 361/85 |
| 2008/0195255 A1* | 8/2008 | Lutze et al. .................. 700/291 |
| 2009/0093916 A1 | 4/2009 | Parsonnet et al. |
| 2009/0222143 A1 | 9/2009 | Kempton et al. |
| 2010/0018228 A1* | 1/2010 | Flammang et al. ............. 62/115 |
| 2010/0025994 A1* | 2/2010 | Cardinal et al. ................ 290/44 |
| 2010/0052421 A1* | 3/2010 | Schindler et al. ............... 307/35 |
| 2010/0179704 A1* | 7/2010 | Ozog ............................. 700/291 |
| 2010/0179862 A1 | 7/2010 | Chassin et al. |
| 2010/0245103 A1* | 9/2010 | Plaisted et al. ................ 340/657 |
| 2011/0030753 A1* | 2/2011 | Weaver et al. ................ 136/201 |
| 2011/0106321 A1* | 5/2011 | Cherian et al. ................ 700/286 |
| 2011/0175569 A1* | 7/2011 | Austin .......................... 320/109 |
| 2011/0238232 A1* | 9/2011 | Tomita et al. ................. 700/291 |
| 2012/0152511 A1* | 6/2012 | Chang et al. .................. 165/202 |
| 2013/0076033 A1* | 3/2013 | Zachary et al. ................... 290/2 |

OTHER PUBLICATIONS

"Store Reneable Energy Yourself", New Energy and Fuel Magazine, 2010, 3 pages.*

Daryanian, Bahman, et al., Automatic Control of Thermal Electric Storage (Cool) Under Real-Time, Pricing, Aug. 1994, NYS Energy R & D Authority, Albany, NY.

* cited by examiner

ELECTRICAL THERMAL STORAGE WITH EDGE-OF-NETWORK TAILORED ENERGY DELIVERY SYSTEMS AND METHODS

BACKGROUND

The Electric Grid

The network over which electrical energy or power is distributed is referred to as the electric grid. Generally, electrical energy is delivered from power plants to end users in two stages. These two stages are bulk transmission and local distribution. Bulk transmission, or "high voltage electric transmission," is the transfer of electrical energy from generating power plants to substations. The portion of the electric grid that is involved in bulk transmission is referred to as the transmission grid. Local distribution is the delivery of electrical energy or power from substations to end users. The portion of the electric grid that is involved in local distribution is referred to as the distribution grid.

Management of the power running through the electric grid is important both to efficient power delivery and to grid maintenance. Electrical energy is difficult and expensive to store and therefore grid management is typically focused on substantially continuously matching production with consumption. Reasons to manage the electric grid efficiently include the following: unused electrical production facilities represent a less efficient use of capital (little revenue is earned when not operating) and by "smoothing" demand to reduce peaks, less investment in operational reserve will be required, and existing facilities will operate more frequently. Most noticeable to the electricity user is that failure to respond to changes in load in time can result in grid instability and grid failure.

A common method of grid management is load management, which is the process of balancing the supply of electricity with the load by controlling the load rather than controlling the output at the power plant. Examples of load management techniques include triggering circuit breakers and using timers. Residential and commercial electricity use often varies drastically during the day, and demand response grid management techniques attempt to reduce this variability based on pricing signals intended to influence end user behavior. Some load management techniques include predictive techniques and involve modeling based on past load patterns, weather and other factors.

Conventional load management techniques have numerous flaws. These flaws include slow response time, as well as interference with customer experience. In some cases, the slowness is inherent. In some cases, the response time is limited by the age of the grid infrastructure. Predictive load management techniques may fail to compensate for some types of events.

Further complicating grid management is the trend toward distributed power generation. Power from a larger number of sources complicates the matching process. Additionally, some power generation, such as wind power, is intermittent.

There is a need for grid management methods and systems that are able to handle the complexities of distributed power generation including generation from intermittent sources, and that respond faster to irregular and unpredictable events in a way that is relatively transparent to the end users.

2. Electric Thermal Storage Heaters

Electric space heating accounts for a substantial minority of heating in commercial and residential living space. Within electric space heating, Electric Thermal Storage (ETS) heaters are currently a niche market, originally developed in Europe during World War II. ETS heaters had a period of regionally-specific popularity in the United States during the 1980's and early 1990's when utilities promoted them as a means to deal with anticipated nuclear generated electric energy at night.

Conventional ETS heaters share the following basic architecture. The ETS heater has a heat sink surrounded by an insulated housing. The heat sink is often made of some type of brick. The brick for example is a type of ceramic brick that can be heated to a high temperature. An example maximum temperature of this ceramic brick is 1200 degrees F. Some bricks, for example conductive bricks developed at Quebec Hydro, West Montreal, Quebec, Canada, are able to achieve a higher temperature.

The ETS heater may further include at least one duct through the heat sink and housing to allow for surrounding air to be circulated past and heated by the heat sink. The ETS heater includes electric heating elements for generating heat and one or more fans for circulating air through the ducts. A room thermostat, that is, a thermostat for measuring the temperature of the space to be heated, is responsible for either directly or indirectly controlling operation of the fan. In the direct case, the ETS heater includes the room thermostat, which controls operation of the fan. In the indirect case, the ETS heater receives a heat call signal from the thermostat and uses that signal to control the fan. The ETS heater typically includes a second thermostat for measuring the temperature of the heat sink. In addition, the ETS heater in some implementations receives signals from an outside temperature sensor which measures the temperature outside of the space to be heated. This temperature is typically the outdoor temperature.

ETS heaters come in two types: room units and furnaces. The distinguishing factor between the two types is that furnaces connect into central heating systems while the room units pump hot air directly into a room. The ETS furnaces further subdivide into whether they connect into air or water heating systems. Within these basic categories, there are also distinctions based on how much energy the heat sink can store and how much power the system can draw. The ETS heater is sometimes the sole heat source, sometimes primary, and sometimes supplemental. For example, ETS furnaces are sometimes used as supplements to heat pumps. In cases where room units provide the sole or primary heat for a building, the ETS heaters are often connected to a main controller by means of a system of low or high voltage wires.

Sometimes an ETS system also controls other sources of heat. For example, an ETS furnace may be connected to a heat pump, and control when the heat pump is actuated.

ETS heater units are often connected together into an ETS system: a central control unit receives signals external to the house, for example the outside temperature sensor signal and an "available/not available" signal, and relays these signals to the individual ETS heater units via some type of local communications network. The individual ETS heater units in the system typically receive input from separate room thermostats with each ETS heater unit responsible for heating a separate "zone" in the area to be heated. Accordingly, an ETS system can consist of a network of a single furnace, a furnace with one or more room units, or multiple room units.

Most existing schemes for controlling the operation of the heating elements in ETS heaters involve establishing at each moment in time a current desired maximum $t_{CDMax}$ and a current desired minimum $t_{CDMin}$ for the temperature of the heat sink. These temperatures may be a function of readings of outside temperature sensors, or they may be a function of both readings of outside temperature sensors and historical fan behavior (which is linked to heat flow out of the bricks). In addition, there is a mechanism for determining that electricity is available for the ETS heater—"available" or "not available." In conventional ETS heaters, this "availability" mechanism does not take into account information from the particular ETS heater. Examples include a timer, or an "offpeak/onpeak" signal sent by power line carrier signals (PLC) over the existing power lines from the utility. When electricity is available to the ETS heater, the ETS heater is not charging, and the current temperature $t_C$ is less than the current desired minimum heat sink temperature, then the ETS heater will begin to charge. Likewise:

| | Electricity Available | |
|---|---|---|
| | Not charging | Charging |
| $t_C < t_{CDMin}$ | Start charging | Continue charging |
| $T_{CDMin} < t_C < t_{CDMax}$ | Continue not charging | Continue charging |
| $t_{CDMax} < t_C$ | Continue not charging | Stop charging |

When electricity is not available, the ETS heater does not charge. Conventional ETS heaters typically have an emergency override feature that is often manually implementable.

The above controls are implemented in conventional ETS heaters using a variety of methods including mechanical, electrical, and hybrid mechanical-electrical systems.

The conventional control mechanisms for ETS heaters often result in significant and prolonged surges in the use in the first few hours of a nightly off-peak "Electricity available" period, followed by minimal to low levels of charging in the middle of the night. This is far from ideal in terms of providing cheap electricity from the point of view of the wholesale purchaser. From a grid management perspective, this is not a good method of flattening the load curve.

In addition, conventional art is not capable of balancing the responsibility for guaranteeing a warm home while simultaneously taking advantage of close to optimal charging profiles. For example, although most ETS-heated homes in a small utility's service area may need only to heat for three hours in a particular day, the utility cannot send out an "available" signal limited to the cheapest three hours of that day because some of the homes may in fact need more energy than they can draw in those three hours.

The heuristic control mechanisms described above become even less optimal in regions with increasing levels of non-carbon generation, where there can be dramatic and variable changes in supply and price.

In conventional art, high penetration of ETS heaters on a circuit of an energy distribution system presents a challenge. There is no method that is both reasonably equitable and close to optimal for dealing with distribution-level constraints. Given that: 1) conventional residential ETS furnaces can charge at up to 45 kW; 2) conventional residential ETS furnaces will often charge at an average of 4-6 kW over a week; 3) and that average household electric loads are typically on the order of 1 kW, the issue of distribution constraints is important be addressed once penetration of ETS heating exceeds, for example, a couple percent.

Some efforts have been made in the conventional art to address the issues associated with distribution constraints—specifically, efforts to avoid the simultaneous activation of heater charging. For example, in many of the ETS heaters, there are either mechanical or electrical mechanisms for introducing some randomness in beginning to charge during a "charge available" cycle. In one implementation, thermal relays take variable amounts of time (up to 3-5 minutes) to turn heaters on, even though all the heater sites may be reacting to the same sensed parameter. In some conventional heaters, the heater operates on an internal 15 minute clock that occasionally resets. Thus, heaters of this type responding to the same signal will stagger over a 15 minute period. In addition, some heaters will charge at a more rapid rate in colder weather, taking advantage of inherently greater capacity on the lines when they are colder.

There remains a need for a decentralized energy management solution that enables buildings with ETS heat to obtain electricity on a more efficient basis (i.e., without burdening the grid unnecessarily) and that likewise enables the grid operator to cost-effectively manage the balance of supply and demand. Further, there remains a need for an energy management system that includes management of distributed power generation including power from intermittent sources.

SUMMARY

The problems of managing ETS heating effectively and efficiently and of managing the electric grid including responding to irregular and unpredictable events are solved by the present inventions of an energy management system for ETS systems that incorporates control, measurement and communications devices, an ETS controller that is responsive to a number of data factors including present and future weather data, present and historical building data, and electricity price, and a grid management system that responds quickly to unexpected or intermittent events.

Additional embodiments include a grid management system that responds quickly and reliably to unpredictable and/or intermittent events, an ETS energy management system for a network of electric thermal heaters/heating systems, local homogenous market structure that can run on top of the ETS energy management system that can flexibly interface with a variety of grid management systems, ETS service network that provides performance data and repair information about individual heaters and ETS area networks, controller for an electric thermal heater/heating system.

The controller on an individual ETS heater includes relays that control the charging of the elements that provide energy to the electric thermal storage heaters. It measures a number of quantities, including but not limited to time, power flowing into the heating elements of each heater, and temperature of the heat sink. The controller is part of the larger ETS energy management system, and includes the communications software and firmware in order to relay information to and from the larger system.

The ETS energy management system includes control, measurement and communication devices for an electric thermal storage heating system. The energy management system charges the heating system based on forecasts of local weather and possibly other information created at a source external to the heated building and tailored to the location of the heated building. The additional information in various embodiments includes electricity price and price forecasts along with some measure of uncertainty, confirmation of commitments to purchase certain amounts of energy in particular market instances, and current and historical data collected at the building by the energy management system. The energy management system (1) collects on-site data and off-site forecasted data and (2) processes this data to implement charging strategies for the ETS system, in such a way that the ETS system more optimally purchases energy while maintaining heating performance guarantees. The energy management system includes of a collection of electronics residing at each building having an ETS system to be controlled. The collection of electronics includes a controller connected to each heater and network devices connecting all the electronics in an ETS area network. In addition, the electronics receive and transmit communications outside the building via an external channel such as the Internet.

The ETS energy management system measures and records a number of quantities: the measurements collected by the controllers in its ETS area network including quantities involving time, temperature, and electricity.

The ETS energy management system performs computations that involve making estimates of future energy requirements for each ETS system in the energy management network over specific periods of time and under forecasted weather scenarios. The estimates of future energy requirements are typically based on information collected by the energy management system both through the external channel and from local measurements and calculations. The energy management system calculates estimations based on both historical data and forecasted data.

Based on estimations of future energy use and other data such as externally or internally provided actual or forecasted prices for electricity markets, the ETS energy management system then activates the heating elements in the various heaters under control in a manner consistent with an energy purchase plan that optimizes some price-like objective function subject to the constraints of maintaining the temperature of the heat sink within an acceptable range the estimation of future energy requirements is included implicitly or explicitly in this optimization. Such an ETS energy management system is capable of providing the ETS system with better performance than the existing art, for a range of performance metrics.

The ETS energy management system is capable of interacting with a variety of larger grid energy management systems. This larger system could employ typical direct load control regimes. Preferably, the larger system has a market-based, distributed control architecture.

The present inventions together with the above and other advantages may best be understood from the following detailed description of the embodiments of the invention illustrated in the drawings, wherein:

DESCRIPTION

An energy management system controls a network of electric thermal heating systems. Each electrical thermal storage (ETS) heating system has one or more electric thermal heaters. The energy management system provides energy to each heating system based on present weather data and weather predictions, building data including historical data, electricity price and energy availability, unexpected grid events, and heating system characteristics including current temperature and capacity. Each thermal electric heating system includes a controller and a network communications device that enables the heating system to be networked to other heating systems and with the energy management system. The energy management system also has the ability to operate as part of a multi-building, multi-region grid control architecture enabling the grid to respond quickly to unexpected events and to absorb and store energy from intermittent sources.

Figure 1:
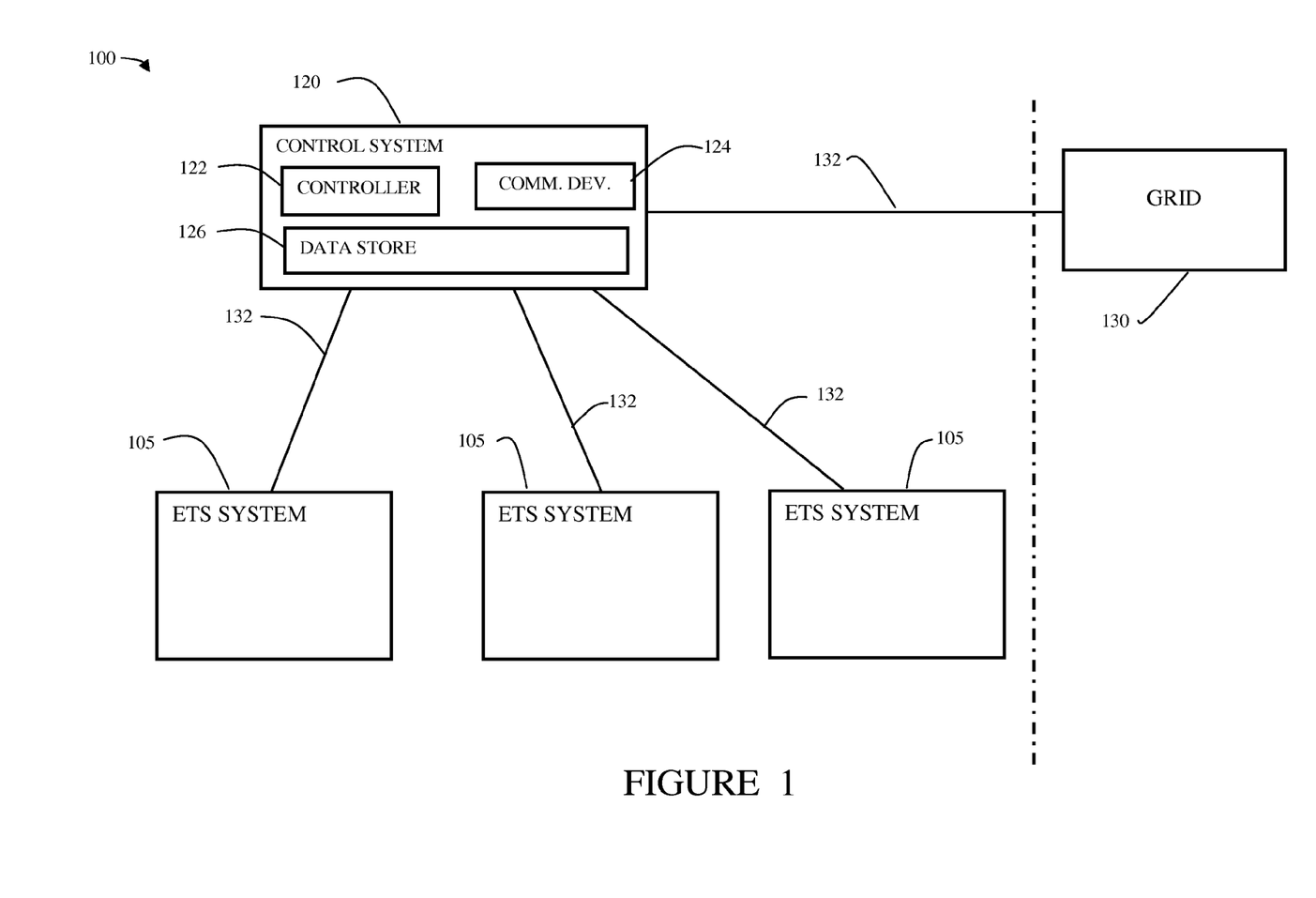
FIG. 1 is block diagram of an embodiment of an energy management system according to principles of the inventions.

FIG. 1 shows an embodiment of an energy management system 100. The energy management system 100 includes a control system 120 controlling a plurality of ETS systems 105. The energy management system 100 is connected to the electrical distribution and transmission grid 130 through the control system 120. The control system 120 includes a controller 122, a network communications device 124 and a data store 126. The data store 126 stores data used by the energy management system and the ETS systems 105. The data, in various embodiments, includes present weather data and weather predictions, building data including historical data, electricity price and energy availability, unexpected grid events, and heating system characteristics including current temperature and capacity. Only the data connections 132 among the elements in FIG. 1 are shown. It should be understood that the control system 120 and ETS systems 105, 110, 115 each draw power from the grid 130 and therefore also are connected to the grid 130.

Each ETS system 105 in this exemplary embodiment, provides heat for a building. Accordingly, one of the ETS systems 105, in a first arrangement, is an ETS furnace system and the rest of the ETS systems 105 are configurations of standalone ETS heaters. One of skill in the art will understand that various configurations of ETS heaters in each ETS system are possible within the scope of the inventions. Further, the number of ETS systems shown is merely exemplary. One skilled in the art will understand that the energy management system is capable of controlling a large number of ETS systems.

In operation, the control system 120 manages the electrical energy provided to the ETS systems such that a minimum amount is provided in order for the buildings to be heated to a defined standard. In an alternative embodiment, the control system 120 manages and provides data used by the ETS systems to manage heat and power usage. The control system 120 also operates to control the energy draw of each ETS system 105 such that the grid 130 is not overburdened and so that electricity costs at each ETS system 105 are minimized. The control system 120 further operates to control the energy draw of the ETS systems such that, as a network of energy stores, the ETS systems store energy from excess electricity on the grid that might otherwise be wasted. In addition communications enable the control system to become part of a larger distributed grid control architecture that can use the ability to rapidly change the power usage of the ETS in order to increase grid stability. As will be described below, the response of the control system 120 and networked ETS systems to grid events is rapid and provides an improved method of grid management compared to conventional methods.

Disclosed below are representative embodiments of methods and apparatus for controlling the electrical power usage of ETS systems as described in the summary.

Figure 2:
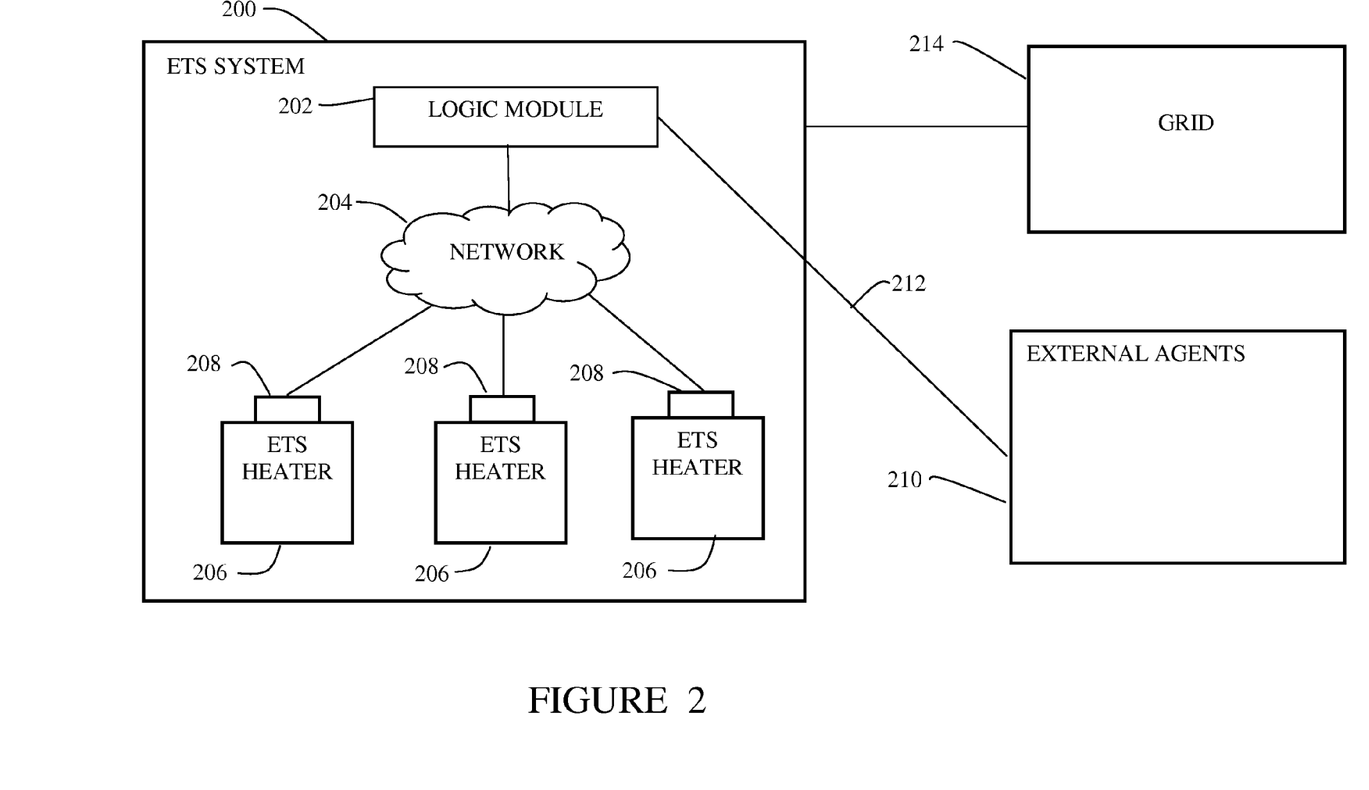
FIG. 2 is a block diagram of an embodiment of an electrical thermal storage system according to principles of the inventions.

FIG. 2 shows an embodiment of an ETS system according to one embodiment. The ETS system 200 of the present embodiment resides inside a building. In a first arrangement, the ETS system 200 functions to fulfill all of the heating needs of the building. In a second arrangement, the ETS system 200 is a supplemental heating system that runs in tandem with another heat source such as a heat pump.

The ETS system 200 includes a plurality of ETS heaters 206 in communication with a logic module 202 over a communications network 204 also referred to as the ETS area network. In one arrangement, the ETS heaters 206 are all stand-alone ETS heaters. In a second arrangement, one of the ETS heaters is an ETS furnace. Each ETS heater 206 includes a Resource Control and Metering Module (RCMM) 208.

Each RCMM 208 may record measurements including but not limited to time, RMS current flowing into each of the heating elements of each heater, RMS voltage, power factor, one or more temperature measurements from within the heat sink in each heater, fan activation speed for moving heat out of the heat sink and into the building space, building temperature in one thermally connected region, building thermostat settings.

The logic module 202 is a piece of electronics that acts as the hub for the communications network—the ETS area network 204. The logic module 202 stores measurements of outside temperature, time data from a local clock and, in some arrangements, building temperature, activation state of an alternate heat source and Global Positioning System (GPS) data. The logic module also stores data recorded and sent from each RCMM. The logic module may have a mechanism for adjusting the timestamp measurements for each RCMM—that is, estimating the degree to which an RCMM clock is uncalibrated—as well as a mechanism for recalibrating both its internal clock and the clocks of the RCMM's. The logic module 202 communicates with the RCMMs 208 within the building via the ETS area network 204 installed over low-voltage lines or power-line carrier. Alternatively, the ETS area network 204 is a wireless network such as a zigbee. Individual RCMMs 208 receive information from and send information to the logic module 202. In addition, the logic module 202 communicates to agents 210 outside the building via an external channel 212. The external channel 212 is, for example, an Internet connection. The external channel 212 in various embodiments is implemented using Ethernet, wireless, or zigbee combined with a smart-grid fiber-optic backbone. In addition, the logic module 202 may receive communications from standard utility communications mediums, such as radio and power line carrier. The ETS system is also connected to the transmission grid 214.

The communications bandwidth of the external channel 212 and the ETS area network 204 is typically large enough to support the following: each RCMM 208 receiving a power set point signal from the logic module 202 every 2-4 seconds, and sending all measurements made at each RCMM 208 back to the logic module 202 asynchronously within 10 milliseconds of a change in power as well as synchronously every 5 minutes.

The logic module 202 and the RCMMs 208 are application-specific integrated circuits, or general-purpose computers, or other types of programmable controller known in the art. In an alternative embodiment, the ETS system 200 includes more than one logic module 202 inside the building. The logic module 202 and the RCMMs 208 in various embodiments include sufficient electronics memory to store a certain amount of data—such as power use, energy levels in the heat sink, external temperature, and historical energy prices. The amount of data is sufficient to provide the means, via an estimation procedure carried out on the logic module, to more accurately assess future energy needs given specific weather conditions than are possible with factory settings that lack specific knowledge of the installation. The specific knowledge typically includes hourly weather, electrical energy use, and brick temperature for several hundred hours. The specific knowledge in alternative embodiments also includes hourly thermostat and room temperature data, address, location in network models for utilities and grid operators (town-line-pole, p-node, or geospatial database identifier) and type of heater. The logic module 202 and the RCMMs 208 have sufficient processor cycles to provide individually-tailored charging strategies to the various ETS units based on both recent historical usage and data, as well as externally-received forecasts of relevant quantities including weather and energy price. The logic module 202 and the RCMMs 208 receive and store historical data, both collected locally at the logic module 202 and the RCMMs 208 and received from an external agent through the external channel. Examples of data received from an external agent include weather data and energy price forecasts. External agents communicating with the ETS system 200 via the external channel have access to information relevant to, but not normally present, within buildings, such as current and future electricity prices for the location of the building, local and global grid constraints and current and future weather information for the location of the building.

The logic module 202 uses information about the location of the heated space to determine appropriate location-specific historical and forecasted data to request from an external agent. The accuracy of this information, at least on a regional level (i.e. New York vs. Maine), is important in order for the apparatus to be compatible with market-based systems that buy and sell wholesale and ancillary energy and require some locational information in the transaction. The location information is either entered by a person or sensed. In one embodiment, the address is entered at the time of sale and verified during installation. In an alternative embodiment, an installed GPS sensor provides the location or address. An IP address can be used as an indicator of accuracy of the general physical location of the ETS system 200. In addition, if an electric car equipped with GPS joins the home network and has the means to communicate with the logic module 202, the GPS on the car can be used as an indicator of accuracy for the location. If the local electric utility has a database of geographical data—such as Arc GIS—including objects representing customer homes, this can also be identified.

The ETS system 200 in some embodiments makes an estimate of the measured quantities detailed above and dependencies between the measured quantities that can provide a reasonable estimate of future energy requirements given various forecasted weather scenarios, charging scenarios, and home usage scenarios.

In case of loss of communication to the grid or between the RCMMs and the logic module, or power loss at the logic module, the ETS systems 200 can continue logging data for up to 8 hours, and can log hourly energy use data for one month.

As ETS systems are already often in place in buildings, it is typically effective and economical to retrofit an energy control system onto the existing heating system. In one embodiment, an existing ETS system has conventional brick ETS heaters and a control module. The existing ETS system is retrofitted with apparatus for controls and communications to function in accordance with the logic module 202 described above. In this embodiment, both the apparatus and the process for completing the retrofit are designed to work with a wide variety of existing ETS systems having solely room units and a controller. In an alternative embodiment, the logic module 202 replaces an original control module, and RCMMs replace old temperature sensors, controls and relays on each ETS heater. In this alternative embodiment, existing communication pathways between the original control module and the ETS heaters are used to create the ETS area network 204. In an alternative arrangement, a new ETS area network such as wireless Zigbee network is installed as part of the retrofit.

In another embodiment, the ETS system is an existing ETS furnace and typically one or more ETS room units. In this embodiment, the ETS furnace includes both an RCMM and a logic module. The room units also include RCMMs. While the electronics hardware RCMMs for heater units and furnaces are typically functionally equivalent, a different RCMM is generally used for the furnace due to the higher power in the furnaces.

In another embodiment, the controls and logic module are designed as part of a new electric thermal storage system and installed during the manufacturing process.

In a further embodiment, the controls and logic module are installed prior to installation at the location of use but after manufacture of the ETS system.

In all of the above embodiments, the ETS system may be the sole source of space heating, the primary source, or a supplemental source. When the ETS system is not the sole source of heating, the logic module in a first arrangement may reports to a higher level hub within the building that makes optimization decisions about using one heating system or the other. Hybrid systems, such as the embodiment just described, do best with externally provided estimations about the cost of the other source of heat through time. Alternatively the RCMM-equivalents measure and control the other heat sources and report to the logic module 202, for example if a heat pump is part of the heating system.

In another embodiment, the apparatus is installed on an unconventional ETS system called deep heat where the heat sink is a combination of sand covered by cement distributed uniformly and forming the floor of the space. This form of space heating generally does not involve an enclosed, insulated cavity for the heat sink and neither does it involve the ability to increase, over the course of minutes, the rate of heat flow into the space—unless predicated by a drop in the temperature of the space. In one embodiment of deep heat, insulation is laid on the ground followed by several inches of sand, then the heating elements, then more inches of sand and then inches of concrete. Deep heat does involve storage of energy provided by electricity, and can be controlled by type of the apparatus described here.

In embodiments where the ETS system is retrofitted on existing, installed ETS heaters, the ETS system also includes a method of tailoring to specific heater models. Part of this method involves recording the physical attributes of the heat sink and insulation for a several sample ETS heaters of the same model. These attributes include specific heat and conductivity, as well as recording the physical dimensions of the air channels, heating elements, fan and temperature probes. This information can be used by the apparatus to filter transient oscillatory behavior of brick temperature, via modeling of the transient heat equation. The method of tailoring to specific heater models also includes instructions that an electrician familiar with the existing ETS system could use to appropriately follow the method of installation.

Generally, the RCMM 208 directly measures quantities that are used to calculate the power into the heating elements of its ETS heater 206. In addition, the RCMM 208 generally measures the temperature in or near the heat sink within the ETS heater 206, and the time. In some cases, the RCMM 206 measures room temperature, thermostat settings, thermostat signals, and the fan activity.

In one embodiment, the RCMM 208 directly measures the root mean square voltage and the current, the frequency, as well as the power factor, at the ETS heater 206 in order to infer the power. In another embodiment, the power provided to the heater 206 is calculated by querying the state of the relays (on, off) that control the heating elements and inferring power based on rated resistance or power draw of the heating elements.

Once or twice a day, or after any prolonged period of no connection, the ETS system recalibrates its internal time clock based on a signal received from an external agent such as the management system of the electrical transmission grid.

In one embodiment of the energy management system 200, the system 200 interacts with a grid-level energy management system. Included in the operation of the logic module 202 is a means for coordinating drawing power from the grid 214 as a sub-asset of a larger energy management systems. In the preferred embodiment the larger grid-level energy management system has a distributed, market-based architecture and the energy management system for the ETS system is a single agent in markets run by this system. In this way, the networked ETS systems assist in maintaining grid balance and avoid the grid problems which may result if the heaters were drawing power at the same time. In a first arrangement, the larger grid-level energy management system has a distributed, market-based control architecture 120 of FIG. 1. In this first arrangement, the energy management system for the ETS represents an agent in markets run by the larger market-based energy management system.

In this first arrangement, the energy management system can make bids on behalf of the ETS system to purchase energy for particular market instances—that is, a particular market and a particular time interval. For example this can be done either with a sequence of (price, kWh) pairs to indicate a demand curve for a particular market instance or set of market instances. Alternatively this can be done as a single energy amount per market instance. For example, once a day at noon the energy management system can submit bids for the each hour in the next calendar day for a Day Ahead market. In addition the energy management system can make a commitment to an external control architecture to follow a power set-point during a particular interval of time. This commitment may contain information about what power levels the ETS system can follow, as well as other information that captures how quickly and accurately the ETS system can respond to a setpoint. For example the energy management system may commit to participate in a Regulation Market similar to the ones run by the grid operators ISO-NE and PJM.

In addition the energy management system can receive commitments for participation in particular market instances. For example, in response to a bid submitted at noon the energy management system may receive at around 4 pm the amount of energy it has committed to purchase in the Day Ahead market for each hour of the next calendar day, along with the price of that energy.

Figure 3:
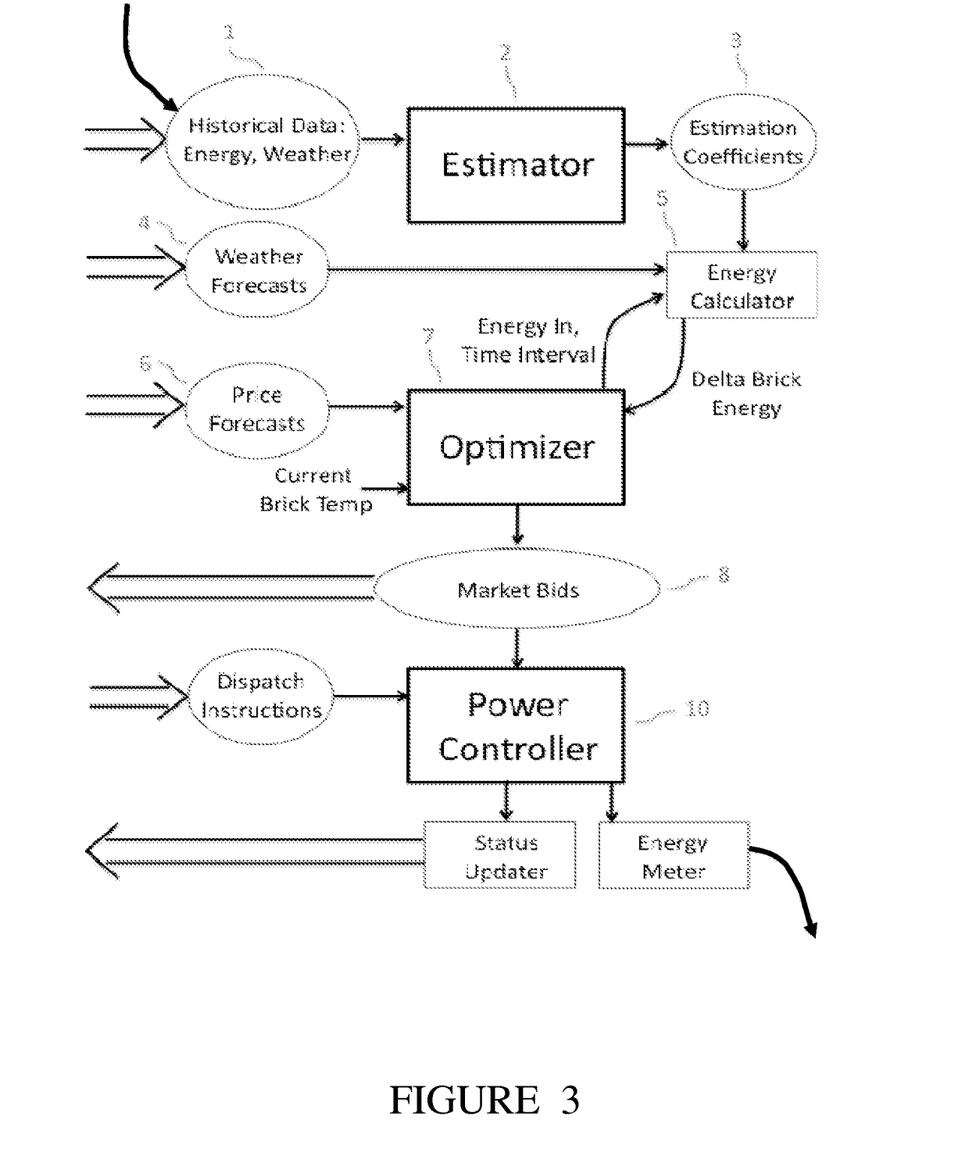
FIG. 3 is a diagram of the data operations of the electrical thermal storage system of FIG. 2.

FIG. 3 is a diagram of the data operations in an embodiment of the electrical thermal storage system such as that of FIG. 2. The logic module 202 in the present embodiment includes an estimator 2, an energy calculator 5, an optimizer 7, a power controller 10. In an alternative embodiment, these elements are part of the RCMM 208. In a further alternative embodiments, the estimator 2, energy calculator 5, optimizer 7, and power controller 10 are distributed between the logic module 202 and the RCMM 208.

The estimator 2 receives energy and weather historical data 1 and calculates estimation coefficients 3. The energy calculator 5 receives the estimation coefficients 3, weather forecasts 4, energy data and time data from the heater and provides calculations of changes to brick energy of the heater bricks to the optimizer 7. The optimizer 7 also receives price forecasts 6 and current brick temperature. The optimizer 7 generates from the provided data, market bids 8, which are transmitted to energy providers (not shown). The market bids 8 are also provided to the power controller 10. In this way, the ETS system 200 operates to control the ETS heaters 206 and to respond to grid events.

Estimation of Future ETS System State

Estimations of the ETS system state are carried out at the logic module. One perspective about what is estimated is how rapidly the building will draw heat from the ETS system. An alternative approach, which contains equivalent information, is to estimate how the heat sink temperature will change over time as a function of various other quantities. For example this estimate can be done via linear regression with the change in brick temperature (in an ETS system having bricks) over an hour as the dependent variable and (1) total electrical energy delivered to the bricks over an hour and (2) the difference between outside temperature and thermostat setting during that hour as the independent variables. The estimate could use trailing hourly data for 2 weeks. This linear regression could be expanded to include indicator variables for the hour of the day, amount of wind, and degree of cloudiness. The estimate could further take into account information directly provided by a person representing the heated space in regards to a change in standard usage patterns or flexibility in thermostat settings.

The energy management can make estimations in the absence of "fresh" external data, for example if the internet goes down for extended periods of time.

In addition the ETS energy management system can accept parameters externally that can be used to refine estimations. For example, historical data may be collected on behalf of the ETS system off-site for a longer period of time and may be processed with better estimation techniques than those present within the ETS system. The ETS system may be configurable to either run its native estimations locally at the logic module or to use externally supplied parameters to make its estimations. Under prolonged loss of external communication an ETS system configured to use externally supplied parameters will revert to using some or all of the local estimations techniques.

Optimization of Energy Purchases

Based on the output of the estimator, the logic module can assign a probable cost—or other price-like objective function—to a particular charging and market participation strategy. The set of possible charging and market participation strategies are subject to certain constraints imposed by safety and ETS performance.

The logic module assigns a cost to a collection of feasible ETS system states over some future period. The feasible states could be restricted to snapshots at the beginning of each hour for the next 48 hours. The relevant state information could include a finite number of possible heat sink temperatures, as well as a finite number of possible market commitments. From any state, there are a finite number of possible forecasted "next states" an hour later that depend on what charging and market strategy is chosen. The determination of possible next states is established via the output of the estimator. This optimization may assume that the price-like function for a strategy spanning days is the sum of price-like functions for each of a sequence of disjoint time intervals, for example hourly intervals corresponding to consecutive market instances. What this rules out, for example, is a cumulative "penalty" where cost is tied in a more complicated way to market performance across many hours. In addition, it may assume that the price-like function for each interval depends only on the market participation and charging during that time interval. If the forecasts of price and weather are accurate, and the estimates of building and ETS response to energy consumption are accurate, it is possible to determine a least-cost charging and market strategy in time that is linear in the total number of states, by determining at each discrete time and for each possible state at that time what the least-cost market and charging strategy is over the next time period.

In addition, both the estimator and the optimizer could keep track of statistical information such as variance. The strategy can then be chosen to either minimize total expected cost, or minimize total expected cost modulo some restrictions on total risk.

The safety and performance constraints include absolute temperature constraints: keeping the heat sink above a minimum temperature needed to effectively heat the building, and below a maximum safety temperature. In addition there may be variable upper limits on the temperature of the heat sinks that depends on the estimated instantaneous heat loss of the building or thermally connected zones in the building. Note that this limit would vary according to the forecasted heat loss from the building as well as the forecasted heater brick temperature and modeled radiative loss.

The market participation plan may include a plan to follow an externally provided set-point for a particular interval of time; for example a plan to participate in a Regulation market. The energy management system must calculate or be provided with an estimate of energy to be used during such a period of time. The charging plan and the market participation plan should be consistent with an externally provided set of market rules. For example, the planned participation in day ahead and real time markets for the same hour preferably matches the total energy planned to be consumed that hour. As another example, the forecasted energy use for participating in a Regulation market with given upper and lower bounds for power preferably matches the total energy planned to be consumed the hour. The calculations are updated as new or more accurate information arrives.

Figure 4:
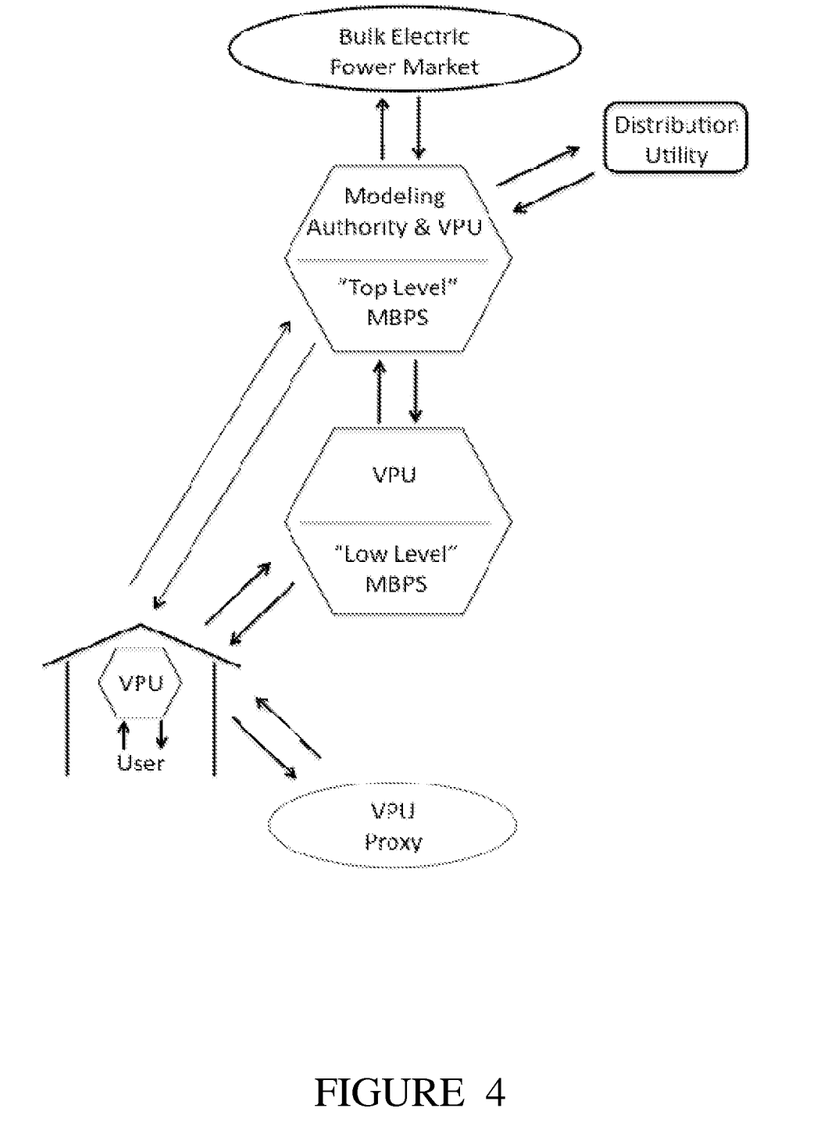
FIG. 4 is a simplified state diagram illustrating how the present invention could be integrated into a decentralized, market-based pricing system.

FIG. 4 is a simplified state diagram illustrating how the present invention could be integrated into a decentralized, market-based pricing system.

The ETS system 200 includes an online optimization of power purchase decisions for an individual electric thermal heater. The ETS system 200 which includes an optimization engine in either the logic module 202 or the RCMM 208 further includes the following elements:

Implemented on-site in hardware within the building that has access to external weather and price forecasts, an external thermometer, temperature near or in the bricks;

Estimates of home heat loss over various pending periods of time;

A constraint that the temperature remains within acceptable bounds of the thermostat settings (these bounds are likely to be asymmetric, with a greater penalty for exceeding the thermostat setting);

Optimization of a well-defined entity such as total wholesale cost, or total wholesale cost minus Regulation revenues;

Constraints, in some embodiments, such as a requirement to purchase a certain amount of electricity from a particular source;

External weather and market forecasts, as well as external or internal forecasts of energy use; and Temperature measurement in the heated buildings, temperature in the bricks in the ETS heaters 206, power in, thermostat calls—and use of this information to adjust and correct estimates of energy storage requirements and limits.

In one embodiment, the controls in the ETS system 200 are subject to hard constraints such as not letting the energy stored in the heat sink drop below a fixed quantity, and more flexible constraints such as the cost risk the energy purchaser is willing to assume in order to minimize overall expected costs. The ETS system 200 typically recalculates planned energy consumption on a regular basis, for example every 4 hours or every 5 minutes.

In the case when the ETS system includes more than one ETS heater, the logic module can employ an internal homogenous market structure that allows the individual heaters to be invisible to the external grid management system. Instead, the entire ETS system appears as a single asset/agent in the larger control architecture, while still maintaining the ability to do both estimation and optimization for each individual heater. This is done by, in essence, "passing through" all the market signals from a larger market. In particular, suppose the ETS system is participating as an agent in a Regulation-like market. In the homogeneous market structure it will enforce that all ETS heaters charge at the same fractional levels—in the simplest case just zero and "full charge"—and the ETS system will present to the larger market with the same fractional levels. Prior to the start of a market instance, each ETS heater will bid into the internal Regulation market (or not). The ETS system takes the sum of the maximum power of all participating heaters and reflects this upwards in its bid in the larger Regulation market. In order to follow the external set-point, the ETS system disaggregates the set-point by scaling it appropriately for each heater. In particular, at any point in time the heaters participating in the internal Regulation market will all be charging at the same fractional level. Energy management systems as described above allow the ETS heaters 206 to outperform the conventional art when measured by the basic performance metric of minimizing cumulative wholesale energy purchase price while keeping the building temperature within a specific range.

Larger Distributed Energy Management Systems and Relevant Response to Grid Signals Standard demand response is generally limited to dynamically priced tariffs and direct load control programs. These methods are limited from the perspective of control theory: the signals can generally provoke only a moderate reaction in load. In addition, there is little ability to differentiate geographically since the signals are generally broadcast. Some of these methods are limited by timescale: the response is not within seconds or minutes, but rather fractions of hours or hours. The response often incurs a change in functional performance of the end device as well.

Figure 5:
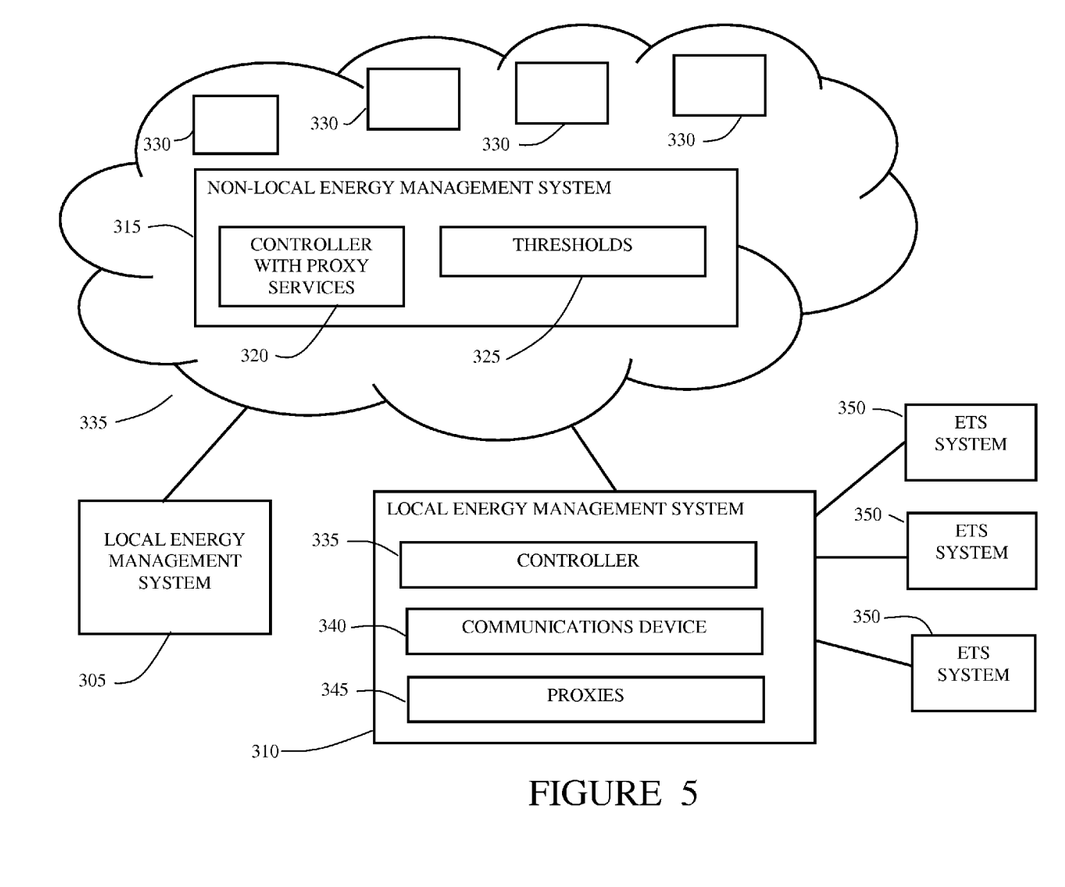
FIG. 5 is a block diagram of an embodiment of a hierarchy of energy management systems according to principles of the inventions.

The energy management system described above allows the ETS heater to be part of a larger grid control architecture shown in FIG. 5. This control architecture involves the local energy management systems 305, 310 interacting with a larger energy management system 315, also referred to as a non-local energy management system, or a distributed energy management system. The larger system includes a controller 320 that sends and receives signals relevant to determining the flow of power to the local energy management systems 305, 310. The larger energy management system may be a distributed, market-based pricing system. In this case, the control signals sent to and received from the local energy management systems will involve a sequence of price signals and commitments to market participation at different price and power levels. The larger system may in fact be the lowest level in a network 335 of computers that form a nested market structure. These computers 330 may be distributed in disparate geographic locations and co-located with other communications infrastructure (e.g. the telephony networks).

There may be redundant back-up so each larger energy management system can operate on a primary computer as well as a mirror; there may also be backup so that lower-level energy management systems can interact with more than one larger energy management system. In addition to the control function, the larger energy management system may also include "proxy" services for the lower level energy management systems, including data storage and computations to assist in forecasting, estimating and optimizing.

The distributed energy management system is responsive to the electric grid and includes a controller 335, a communications device 340 and a plurality of proxies 345. The controller 335 receives and dispatches individually-tailored signals relevant to real-time power consumption and commitments for future energy use to the larger grid energy management system 315 and to a plurality of ETS systems 350 each having a local energy management system. The control system is responsive to signals generated from real-time measurements on the electric grid such that a balance of power generation and power draw on the electric grid is maintained. Further, the controller operates to control the plurality of ETS systems such that energy generated by intermittent energy sources is absorbed.

The communications device 340 establishes a communications connection with the larger grid energy management system 315 and establishes communications connections with each ETS system 350 in the plurality of ETS systems.

The distributed energy management system 310 further includes plurality of proxies 345, each proxy associated with one of the ETS systems 350 in the plurality of ETS systems. Each proxy 345 includes a data store storing weather data, characteristics of its associated ETS system and characteristics of the location of its associated ETS system. In an alternative arrangement, the data store also stores electricity price data including present price data, historical price data and forecasted price data. In a further alternative arrangement, the data stores further store historical energy generation data of intermittent energy sources and seasonal conditions. In further alternative arrangements, the stored data includes history of energy consumption and characteristics of the location of each ETS system. The location data may include data specific to the geographic location of the ETS system as well characteristics of the building in which the ETS system operates. The plurality of proxies develops data that can be used in improved operational strategies for each of the ETS systems 350 in the plurality based on data stored in the proxy data store.

For security reasons, there may be a set-point, also referred to as an upper limit, or "threshold" 325 on the order of several MW in terms of the size of a larger distributed energy management system with which a building energy management system can directly communicate. Each local energy management system provides verification that it is operating below the set-point. Due to the strategy of using existing Internet and Ethernet technology and applications in buildings, the security of "edge" distributed systems that interact directly with local energy management systems in buildings may be lower than the security of a number of "edge" systems participating in a higher level system.

The control architecture described above consisting of nested distributed energy management systems allows the energy management system for an ETS system to assists in maintaining reliability and stability of the electric grid by responding relevantly to direct measurements from the electric grid.

As an example, there may be a real-time Supervisory Control and Data Acquisition (SCADA) reading of the total power on a distribution circuit, and during times when the power approaches the maximum capacity of the circuit the larger distributed energy management system allocates a higher market price to energy, which it communicates to the local energy management systems for each ETS system. As the capacity on the line becomes a real constraint, the price over the course of the day will become less variable, relatively speaking, and each local energy management system will respond with a more uniform charging plan. This results in the larger energy management system successfully controlling load to respect a local distribution constraint, while still minimizing total cost given this constraint.

As another example, the Regulation markets run by grid operators are a method for responding relevantly to signals generated from the transmission grid. The transmission grid refers to the higher-voltage transmission lines operated by grid operators such as ISO New England, Inc. (ISO-NE) and PJM Interconnection (PJM). The electric grid signal in this case is the Area Control Error, which is calculated from local frequency deviation from 60 HZ as well as direct SCADA measurements at interchanges. While ETS systems are generally too small to participate in markets run by grid operators, a larger distributed energy management system may act as an intermediary—both participating in the larger Regulation market and running its own Regulation-like market in which the local energy management systems participate. When the local energy management system participates in a such a Regulation-like market, it is responding relevantly to a direct measurement from the electric grid.

As a third example, the energy management system is capable of responding directly to sensed deviation from 60 Hz. The inertia of flywheels in large generators provides a natural negative feedback loop that helps stabilize grid frequency. For example, there may be a market run by a larger distributed energy management system for "inertia" which refers to a commitment to response in a particular way to deviations in sensed frequency—in order for this to be a true inertial response, it must occur on the order of wavelengths (10 ms).

Figure 6:
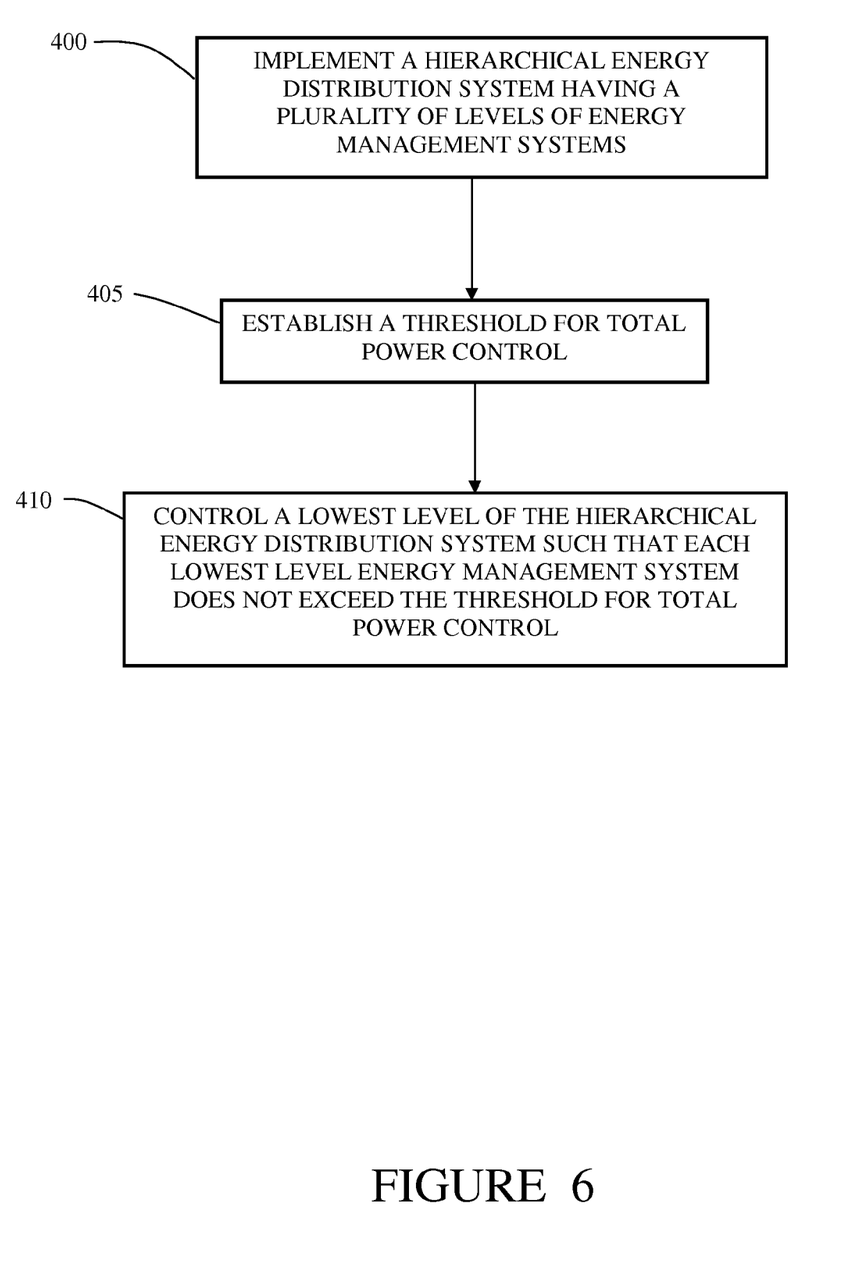
FIG. 6 is a flow chart of the operation of a security system in the hierarchy of energy management systems of FIG. 5.

FIG. 6 is a flow chart of the operation of a security system in the hierarchy of energy management systems such as that described with regard to FIG. 5. At step 400, a hierarchical energy distribution system is implemented. The hierarchical energy distribution system has a plurality of levels of energy management systems. The plurality of levels includes in one embodiment, one or more large energy management systems, one or more distributed energy management system and a plurality of ETS systems, each having a local energy management system. At step 405, a threshold for power control is established. For security purposes, the level of power controlled by any lower level is maintained beneath pre-determined set-points. This helps to maintain grid integrity in that generally no single energy management system can cause a large grid disturbance either through accident or deliberate action. For example, at step 410, the lowest level of the hierarchical energy distribution system is controlled such that each lowest level energy management system does not exceed the threshold for total power control. For added security, the hierarchical energy distribution system is implemented such that the control systems of the energy management systems are distributed over a plurality of geographic locations.

Safety and Maintenance

Existing furnaces often have a safety issue, in that if the existing relays fail in the "on" position there is no emergency backup shutoff. This safety issue has been dealt with for Underwrite Laboratory (UL) certification purposes by drastically under-rating the relays. Embodiments of the inventions include a failure backup for the ETS heater by simultaneously reducing the cycles of the original relays and leaving them as safety backup in the "on" position in series with new relays which do most of the switching.

Alternative Embodiments

In a first alternative embodiment, the ETS system 200 is capable of outsourcing some estimation and optimization calculations to the proxy agent. In a second alternative embodiment, the ETS system 200 has the ability to switch to "all-local" mode in the event of prolonged absence of the external channel. In a further alternative embodiment, the ETS system has the ability to data log and to resend logged data in the event of failure of the external agent. In the preferred versions of the disclosed embodiments, at least one External Agent 210 (shown in FIG. 2) is a market-based pricing system and Modeling Authority. The market-based pricing system could involve optimal power flow solutions to determine locational marginal pricing as demonstrated in the bulk energy markets run by Regional Transmission Organizations/Independent System Operators (RTOs/ISOs) such as ISO NE, PJM and the Midwest Independent Transmission System Operator, Inc. (MISO). The Modeling Authority fits the standard architecture for Modeling Authorities present in the Common Information Model (the International Electrotechnical Commission (IEC) standard) and includes information relevant to the operations of the market. For example, the Logic Module 202 (shown in FIG. 2) at each location is included in an Agent Database for the Modeling Authority, and this Agent Database could be used to maintain information about availability, type, and location of various transactive loads participating in the market based pricing system. Further, the energy management systems described herein can also be applied to other types of thermal storage systems such as those using water as the heat sink.

Advantages

Embodiments of the energy management system and grid management system are above to use online optimization, stochastic optimization, electricity markets and distributed computation in order to efficiently and economically manage energy using installed ETS heaters. Planned energy purchases can be optimized against a wide variety of objective functions, for example, day-ahead vs. real time. Further, penalties may be applied to deviations in day-ahead reported energy use. Further optimizing includes the provision of ancillary services with wholesale energy purchase. One of the benefits of the innovative ETS control systems described above is that in some embodiments, the control system allows the ETS to participate as an agent in a market-based pricing structure, make more efficient use of existing energy resources and create more dynamic load response to price input than is possible with competing solutions. Creating dynamic load response to price was the original intent in creating locational marginal prices; over the last several decades there has been more response from generators than load. This innovative ETS control system represents an opportunity to create more dynamic load response to price, allowing grid operators and utilities to more efficiently manage the flow of electricity.

It is to be understood that the above-identified embodiments are simply illustrative of the principles of the invention. Various and other modifications and changes may be made by those skilled in the art which will embody the principles of the invention and fall within the spirit and scope thereof.

We claim:

1. An energy management system for at least one device drawing power from an electric grid, comprising:
a system having at least one controller, the system able to connect to a computer network, the at least one controller operating on an ETS heater, the ETS heater including a heat sink, wherein the system uses characteristics of the ETS heater, heated space characteristics, temperature data, current weather data, forecasted weather data, and electricity price data to operate the heater to control the draw of power from the electric grid, wherein the system controls the ETS heater such that a minimum temperature of heated space is maintained, power is drawn under a maximum price of electricity, and maximum temperature of the heat sink is not exceeded.

2. The energy management system of claim 1 wherein the system further uses historical electricity price data, present electricity price data and forecasted electricity price data to control the draw of power from the electric grid.

3. The energy management system of claim 1 wherein the system further comprises a plurality of controllers each operating to control one of a plurality of ETS heaters and wherein each of the plurality of controllers is in communication with other controllers in the plurality of controllers over a local area network.

4. The energy management system of claim 3 wherein the system further includes a logic module and each of the plurality of controllers is in communication with the logic module over the local area network, wherein the logic module takes the heater characteristics, heated space characteristics, temperature data, current weather data, forecasted weather data, and electricity price data to determine control data, the logic module to provide the control data to each of the plurality of controllers.

5. The energy management system of claim 1 wherein the system further comprises a logic module further wherein the logic module takes the heater characteristics, heated space characteristics, temperature data, current weather data, forecasted weather data, and electricity price data to determine control data, the logic module to provide the control data to the at least one controller.

6. The energy management system of claim 5 wherein the logic module further comprises an estimator, an energy calculator, an optimizer and a power controller.

7. The energy management system of claim 1 wherein the system uses GPS data in controlling the ETS heater.

8. The energy management system of claim 1 wherein the system responds to a signal generated from real-time measurements on the electric grid.

9. The energy management system of claim 8 wherein the system is in communication with one or more grid energy management systems over a communications network and wherein the energy management system responds to signals generated from real-time measurements on the electric grid and to signals from the energy management systems.

10. The energy management system of claim 1 wherein the system is in communication with a control system over a communications system, the control system responsive to the electric grid and wherein the energy management system responds to a signal from the control system.

* * * * *